United States Patent
Callahan

(10) Patent No.: US 6,684,578 B1
(45) Date of Patent: Feb. 3, 2004

(54) KUDZU CONTROL METHOD AND APPARATUS

(76) Inventor: Jack Newell Callahan, 3621 Crestwood Dr., NW., Cleveland, TN (US) 37312

( * ) Notice: Subject to any disclaimer, the term of this patent is extended or adjusted under 35 U.S.C. 154(b) by 0 days.

(21) Appl. No.: 10/316,634

(22) Filed: Dec. 10, 2002

Related U.S. Application Data

(60) Provisional application No. 60/369,679, filed on Apr. 2, 2002, and provisional application No. 60/353,751, filed on Jan. 31, 2002.

(51) Int. Cl.[7] .......................... H02G 7/00; A01G 13/00
(52) U.S. Cl. .......................................... 52/147; 47/32.5
(58) Field of Search ................. 47/20.1, 23.1, 47/23.2, 32.4, 32.5, 58.1 R; 52/147, 101

(56) References Cited

U.S. PATENT DOCUMENTS

| | | | | |
|---|---|---|---|---|
| 428,206 A | * | 5/1890 | Fouquet ...................... | 47/32.4 |
| 494,874 A | * | 4/1893 | Majola ........................ | 47/32.4 |
| 1,938,957 A | * | 12/1933 | Fox ............................. | 74/127 |
| 1,994,101 A | * | 3/1935 | Hawkins ..................... | 43/108 |
| 2,003,959 A | * | 6/1935 | St. John ...................... | 52/147 |
| 2,061,306 A | * | 11/1936 | Hocher et al. ................ | 52/147 |
| 2,264,430 A | * | 12/1941 | Bierce ......................... | 52/147 |
| 3,333,361 A | * | 8/1967 | Manak ..................... | 47/58.1 R |
| 3,531,900 A | * | 10/1970 | Vaughn ........................ | 52/101 |
| 4,244,156 A | * | 1/1981 | Watts, Jr. ................... | 52/746.1 |
| 6,223,463 B1 | * | 5/2001 | Carlson et al. ............... | 43/108 |
| 6,226,933 B1 | * | 5/2001 | Nelson et al. ................ | 52/101 |

FOREIGN PATENT DOCUMENTS

| | | | | |
|---|---|---|---|---|
| JP | 11-355946 | * | 12/1999 | ............ H02G/7/00 |

OTHER PUBLICATIONS

Clayton, Ron. Aug. 31, 2002. New device may control kudzu. Chattanooga Times Free Press: p. A1.*

Kudzu Management Program: Containing the Spread and Reclaiming Lands, The Problem and Potential Solution. Author unknown—pp. 1–11.

Kudzu the Plant. Author unknown—p. 12.

Kudzu in Alabama: History, Uses, and Control. pp. 1–6. Alabama A&M and Auburn Universities.

* cited by examiner

*Primary Examiner*—Peter Poon
*Assistant Examiner*—Jeffrey L. Gellner
(74) *Attorney, Agent, or Firm*—Stephen J. Stark; Miller & Martin LLP

(57) ABSTRACT

A method for controlling the spread of kudzu utilizes vertical, or near vertical, smooth surfaces which do not provide a horizontal step for continued vertical growth of kudzu. Accordingly, a clear zone may be established mechanically or otherwise and guards placed intermediate the kudzu and an area to be protected wherein when the vines contact the guards, they are unable to unsupportedly span the guard to continue upward growth and then into the protected area.

20 Claims, 2 Drawing Sheets

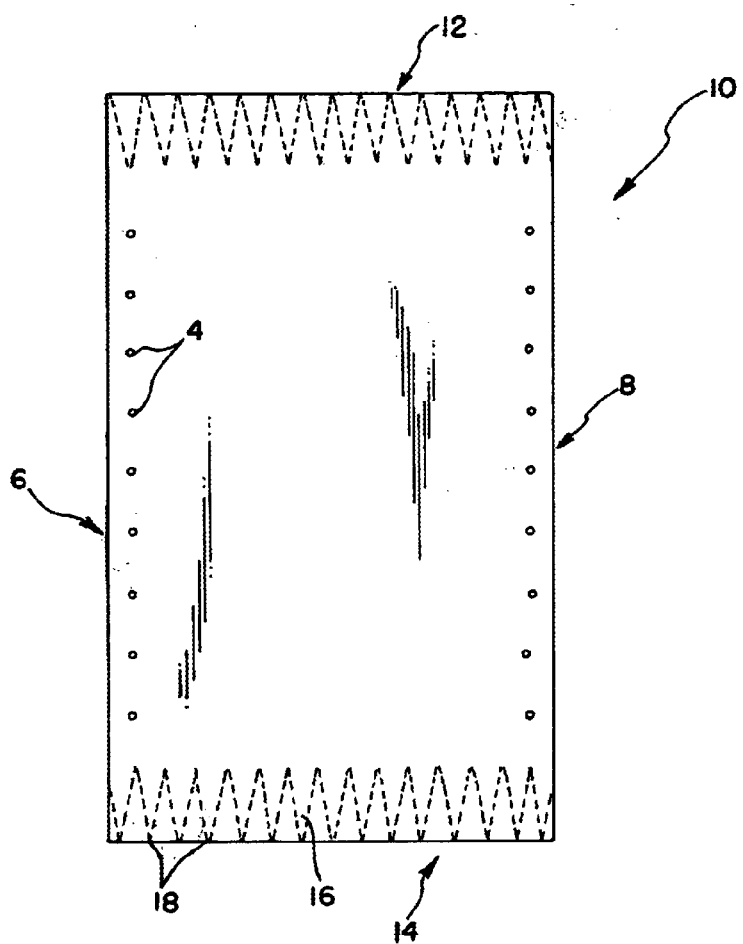
FIG. 1
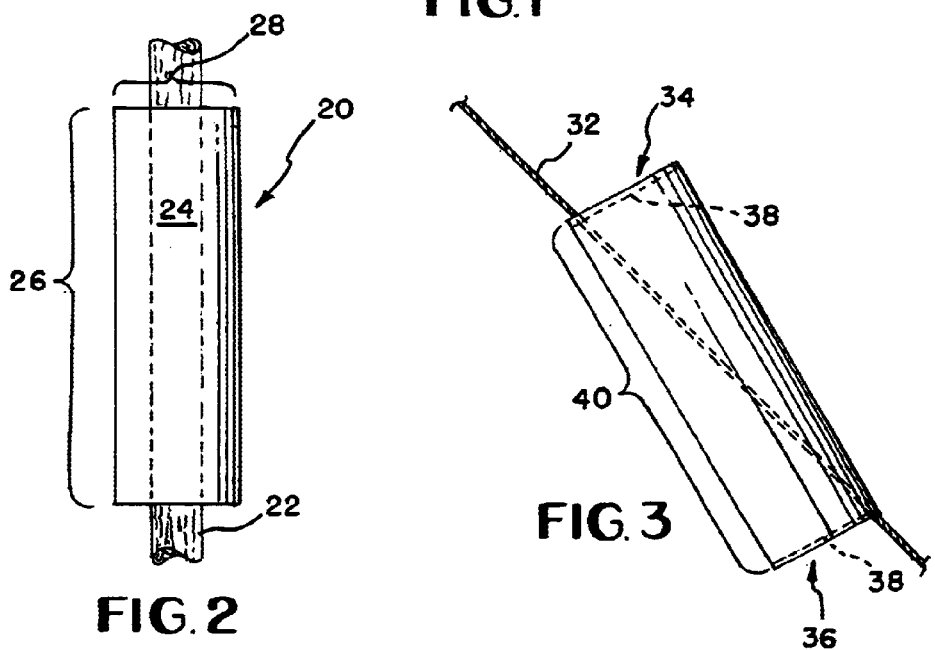
FIG. 2
FIG. 3

KUDZU CONTROL METHOD AND APPARATUS

This application claims the benefit of U.S. Provisional Patent Application No. 60/369,679 filed Apr. 2, 2002, and U.S. Provisional Patent Application No. 60/353,751 filed Jan. 31, 2002.

FIELD OF THE INVENTION

This application is directed to a method and apparatus for controlling the growth of kudzu, more specifically to the use and deployment of barriers for limiting the range of growth of the kudzu vine.

BACKGROUND OF THE INVENTION

Kudzu (Pueraria Spp.) was introduced in the United States in 1876 at the Centennial Exposition at Philadelphia, Pa. In the 1920's it was discovered that animals would eat the plant and it was promoted as forage at that time. In the 1930's, the Soil Conservation Service promoted the use of kudzu for erosion control. Since that time, kudzu has spread and been utilized all over the southeast portion of the United States.

Kudzu is a non-native trifoliate-leafed, semi-woody climbing vine. The vines are capable of going up to 60 feet in a single season with as much as one foot per day during early summer. The starchy, tuberous root can reach a depth of 12 feet and weigh between 200 to 300 pounds. Vines spread growing from a root crown and will root every few feet at the nodes forming a new plant. Mature stands may have a plant every one to two feet and one acre can easily contain tens of thousands of plants.

While primarily a problem in the southeastern United States, kudzu has spread to the northeast and midwestern regions as well. It is estimated that over seven millions of acres have been ensnared by this plant and it is roughly spreading at the rate of 120,000 acres per year at an exponentially increasing rate. It has infected millions of acres of farmland, forest land, highway and utility right of ways in small cities, large metropolitan and suburban areas.

There are four conventional methods of controlling kudzu. Herbicides can kill the vegetation, but it has been discovered that repeated treatments are necessary to eradicate kudzu. Often up to five, if not ten years, of repeated treatment is necessary. Herbicides may not be particularly environmentally friendly and/or may be relatively expensive.

Grazing animals will readily eat kudzu foliage. Overgrazing is a possible treatment when the grazing animals are fenced within an area of kudzu. Unfortunately, if any of the kudzu extends beyond the boundary of the fenced areas, as soon as the animals are removed, the infestation typically begins anew.

Mechanical removal may be utilized, but it is preferred to remove the roots. While mowing, weeding or other mechanical removal techniques can provide a landowner with immediate satisfaction, if the roots are not removed, the growth will emerge back into the control area.

Finally, prescribed burning will weaken the roots by consuming the foliage, however, burning is a dangerous technique since the fire must be controlled. Furthermore, repeated burning will be necessary.

Accordingly, a need exists to control kudzu in a selected area and/or once kudzu infestation has occurred, selectively preventing kudzu reinfestation into selected areas.

SUMMARY OF THE INVENTION

In one embodiment of the present invention, a guard is placed about a tree, utility poles, and/or guy wires supporting utility poles. It has been discovered that kudzu can grow up to slightly less than about four feet unsupported in a vertical or horizontal direction. Once the vine achieves this approximate critical distance, the weight of the vine is acted on by gravity to pull the stalk back down towards the ground if the stalk has not securely attached itself to a structure such as a tree or otherwise.

The guard provides a barrier in the form of a smooth vertical surface which prevents the vine from continuing vertical growth since as the vine attempts to wrap itself around the guard, it reaches a critical length before the vine has solidified enough to form a supporting base to continue upward growth. A predetermined circumference length has been found necessary to prevent attachment to the guard. Accordingly, as the vine attempts to wrap around and climb up, as it reaches a certain length, the weight of the vine causes it to fall away from the guard. The guard's smooth surface acts in harmony with the kudzu plant's limited unsupported vertical reach characteristic. Accordingly, the kudzu is unable to pass the barrier and continue its upward climb. The guard has effectively stopped the progress of the vine.

Plastic sheets may also be utilized to prevent horizontal movement of the plant past a desired point. Since the vines only spread on top of the ground, the sheets may be placed in the path of the kudzu and as long as the sheets extend above the predetermined height and down to the ground, the kudzu will be unable to climb under or up and over the sheets. It is important that the sheets extend down to the ground since any openings through the sheet will provide an opportunity for the kudzu to pass through and/or support continued growth up and over the sheets. The sheets may be combined with a fence for support so that the fence prevents advancing kudzu from infesting a particular area.

Another embodiment of the invention is a flag design which prevents the kudzu vine from completing a wrap about the flag as it attempts to climb up a guy wire or other structure. Once again, the flag must have a certain length and width combination so that the kudzu cannot unsupportedly climb from one end of the flag to the other therefore bypassing the flag.

DETAILED DESCRIPTION OF THE DRAWINGS

The particular features and advantages of the invention as well as other objects will become apparent from the following description taken in connection with the accompanying drawings in which:

FIG. 1 is a first embodiment of a guard showing the manufacturing process;

FIG. 2 is an installed guard of the construction shown in FIG. 1;

FIG. 3 is an alternatively preferred embodiment of the guard of FIG. 1;

DETAILED DESCRIPTION OF THE DRAWINGS

Figure 4:
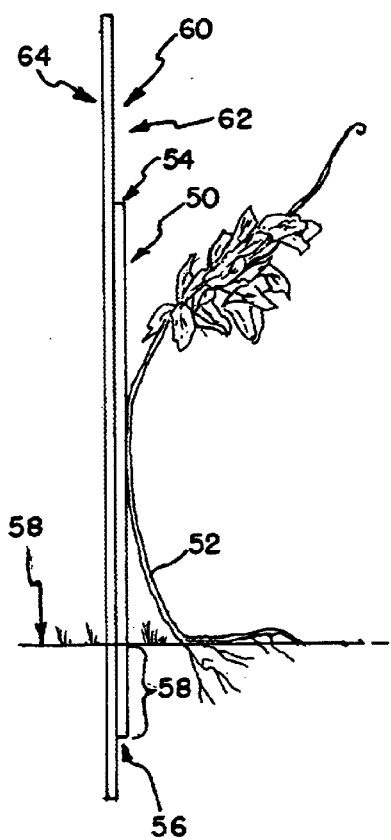
FIG. 4 is another alternatively preferred embodiment of the guard shown attached to a fence.

FIG. 1 shows a sheet 10 of flat material such as plastic or other suitable material. It is preferably semi-rigid and opaque. Opposing ends 12,14 may be cut with serrations as illustrated so that when a sheet 10 is rolled into the form of tube 20 shown in FIG. 2, the serrations 16 with points 18 can be turned toward a vertical support such as tree 22 illustrated in FIG. 2, so that the serrations 16 support the tube 20 about the vertical support. The points 18 are preferably folded toward the vertical support, such as tree trunk 22 beyond about 90°. The points 18 and serrations 16 are to assist in holding the tube shape, fasten the tube 20 to the tree 22 and form a non-transparent closure to reduce the space between the tube 20 and the tree 22 such that kudzu will not normally enter into the interior of the tube 20. Any method to effectively close the bottom gap between the tree, pole, etc., and the tube is acceptable.

The sides 6,8 of the sheet 10 shown in FIG. 1 are illustrated with holes punched with ⅛" diameter approximately 4 inches spaced apart from one another at each of the sides 6,8. The sides 6,8 are then pop riveted together as shown in FIG. 2 to form tube 20 which is illustrated in use as a guard. Although pop rivets are one way of constructing the tube 20, other connectors including adhesives, mechanical fastening devices or other means may be utilized to form the tube 20.

When utilizing the tube 20 in an infested site, preferred preparations include removing all existing vines and other structure which could provide a foothold for advancing kudzu to form a clear zone of at least five feet high. The clear zone will be void of horizontally extending vegetation as well as vertical members having a diameter less than about seven inches except for these items to be equipped with a guard.

A tube 20 is then placed around the trunk of the tree 22 to be protected such as one having a diameter of less than about seven or eight inches. The tube sides 6,8 are then pop riveted together through the holes 4 to form approximately an eight inch or greater diameter tube 20 with serrated ends 12,14. Of course, the diameter 28 of the tube 20 could be as small as about eight inches and still function satisfactorily according to tests performed by the inventor.

The smooth vertical surface 24 removes the opportunity for the vine to encircle about the diameter of the vertical support 22 and then harden enough to continue upward climbing. The vertical distance 26 of the tube 20 is preferably at least about 42 inches or more preferably greater than about 48 inches long in this embodiment. The diameter 28 is preferably greater than about eight inches. This equates to a circumference of greater than about 24 inches. Accordingly, although the tube 20 is illustrated as having a circular cross section, it could take other geometric shapes such as a triangular, square, or other shaped cross section. Furthermore, the cross section need not be uniform along the height as long as there are no horizontal support locations along its height or other likely footholds such as sufficiently configured openings for the kudzu vine to support itself in its attempts to climb vertically along the vertical body 22.

One advantage of the design of the tube 20 is that as the tree grows, the serrations 16 can deflect until the tree 22 has approximately the same circumference as the tube 20 at which time the tree 22 may grow such that the tube 20 is broken. However, by this time the tree 22 will have a large enough trunk as to prevent kudzu from growing up the tree since the trunk will act as a guard by itself.

Accordingly, if all trees in a pine stand having a small diameter at the approaching edge of a kudzu infestation are similarly treated, such as with tubes 20, for a distance of approximately thirty feet back into the shaded area, the advance of kudzu may be stopped. Kudzu has a low shade tolerance (based on the percent of shade). Furthermore, kudzu does not grow upward without being in or very near direct sunlight. Accordingly, once the vines pass into heavy shade, they do not readily climb vertically unless in the presence of sufficient sunlight.

Tubes 20 may also be utilized to reestablish trees in infested kudzu fields by planting trees having relatively small trunks such as two to three inch diameters and then placing the tube 20 around the trunk. In this manner, infested areas can be landscaped without the use of herbicides. Furthermore, as the shade of the tree increases, the kudzu may be shaded out. The tube 20 may be placed about utility poles and/or guy wires to prevent lines from similar intrusion. When utilizing the tube 20 on guy wires as shown in FIG. 3, the ends 34,36 would not necessarily be serrated as done in the preferred embodiment. Instead, caps 38 may be placed at the ends 34,36 so that the tube 30 may be held fixably relative to the guy wire 32.

Just as in the preferred embodiment, the sheet material utilized may be on the order of about 30 mil, however, other thicknesses may also be suitable for some applications and/or other embodiments. The length 40 is on the order of about four feet since the kudzu vine could establish itself on the guy wire 32 near the bottom 36 of the tube 30 and then extend a little over 40 inches unsupported towards the top end 34 of the tube 30. However, since the length 40 exceeds the extension length of unsupported kudzu, the kudzu will not be able to reach far enough to attach itself again to the top of the guy wire 32 above the top 34 of the tube 30. The caps 38 may be the same mil thickness of the tube or otherwise. Additionally, the caps 38 may have a lip such as about one inch somewhat similar to a cake pan. The caps 38 may be stapled or otherwise attached to the tube 30.

It is preferable that the bottom end of tube 30 be installed at at least five feet above the ground on the guy wire and be made to extend as near to vertical as possible as shown in FIG. 3 depending upon the angle made between the guy-wire and the ground. When connecting the cap 38 to the tube 30, the guy wire 32 may be captured therebetween so that the tube 30 is securely positioned on the guy wire 32. Furthermore, the caps 38 seal the opening of the tube 30 which will eliminate any kudzu from entering the tube itself.

A third embodiment of the kudzu control system includes a vertical planar sheet 50 shown in cross section FIG. 4. Also shown in FIG. 4 is the kudzu vine 52 extends up towards the top 54 of the sheet, the effect of gravity causes it to bend away as illustrated in FIG. 4 and fall back down before it can reach the top and climb on over the top 54 of the planar sheet 50. The bottom 56 of the sheet is shown buried in a trench at the ground level 58. Since kudzu does not spread underneath the ground by rhizomes, it cannot burrow below the bottom 56 of the sheet 50 to spread past the sheet 50 without climbing over top the sheet 50.

In the embodiment illustrated, the sheet 50 is buried to a depth 58 of about 6 inches and extends at least about 42 inches above the ground. Accordingly, the sheet 50 may be 48 inches or greater. The sheet 50 may be made of a vinyl or other materials as long as it is relatively smooth and weather and rot resistant.

The sheet 50 is shown attached to a fence 60 which could be any type of fence product. The sheet 50 may be connected to the fence 60 as long as the sheet 50 is on the kudzu side 62 as opposed to the protected side 64 of the fence 60. In this manner, the horizontal advance from the kudzu side 62 to the protected side 64 will be halted through the use of the sheet 50. It is preferable to ensure that vegetation or structure such as ragweed, sumac, small trees, etc. are removed beginning at least four feet from the guard side 62 since the kudzu can climb these structures and then extend over the guard.

Figure 5:
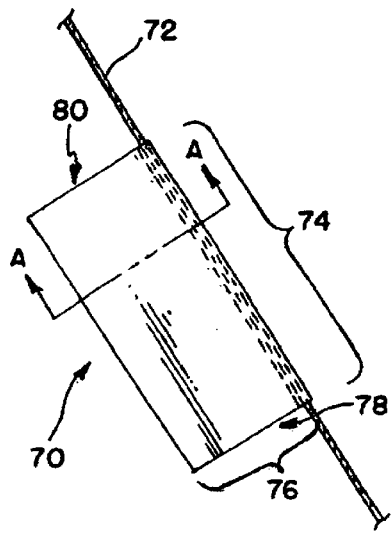
FIG. 5 is another embodiment of the guard illustrated attached to a guy wire.

Through the testing of the sheet 50 and guards and tubes 20,30, it was discovered that the guards need not necessarily be round in order to prevent kudzu from continuing its upward advance. FIG. 5 shows a first embodiment of a flag design 70 connected to a guy wire 72. The flag has a length 74 such as preferably about four feet long, and more preferably about 5 feet long and has a width 76 of at least about 12, if not 18 inches. As the kudzu climbs up the guy wire 72, towards the bottom 78 of the flag 70, the vine is unable to make it around the width 76 and up along the length 74 without gravity pulling the vine back down toward the ground. Thus, the vine is unable to continue upward travel up the guy wires 72 past the top end 80 of the flag 70.

Figure 6:
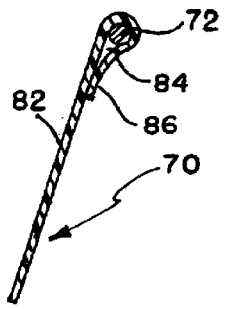
FIG. 6 is a cross sectional view taken along the line A—A of FIG. 5.

FIG. 6 is a cross sectional view of the flag 70 shown in FIG. 5. The flag 70 is d of a sheet 82 which is bent about guy wire 72 to form a flap 84 and then sealed with flap 86 back against sheet 82. The flap 86 may overlap the sheet 82 by about an inch or more. There are many ways the flag 70 may be held in position relative to the guy wire 72 as are the art.

Figure 7:
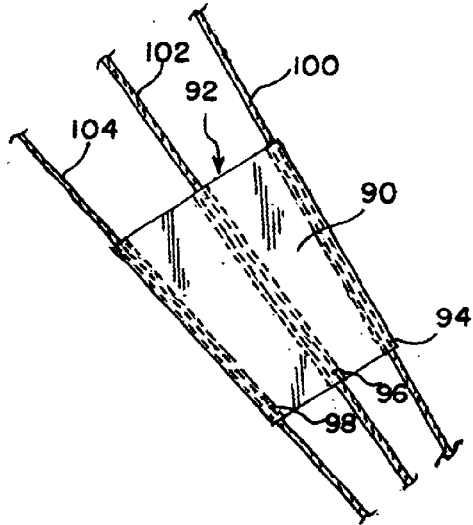
FIG. 7 is yet another embodiment of the invention connected to multiple guy wires as illustrated.

Finally, FIG. 7 is an alternatively preferred embodiment for utilizing a single flag 90 for use with multiple guy wires to prevent kudzu from traveling past the top end 92 of the flag 90. The flag 90 contains at least one pocket 94,96,98 to receive and allow each of the respective guy wires 100,102, 104 pass therethrough. The flags 70,90 may be constructed of 30 mil plastic or other different materials just like the tubes 20,30.

Numerous alterations of the structure herein disclosed will suggest themselves to those skilled in the art. However, it is to be understood that the present disclosure relates to the preferred embodiment of the invention which is for purposes of illustration only and not to be constructed as a limitation of the invention. All such modifications which do not depart from the spirit of the invention are intended to be included within the scope of the appended claims.

Having thus set forth the nature of the invention, what is claimed herein is:

1. A method for controlling the spread of kudzu comprising:
    providing a vertical clear zone having a predetermined height of at least about five feet wherein said vertical clear zone is absent of vegetation except for tree trunks having a diameter greater than about eight inches;
    placing a guard within the clear zone and intermediate a kudzu vine and an area to be protected, said guard having at least a relatively smooth exterior planar surface extending a length of at least about forty-two inches;
    allowing kudzu to grow against the guard, and said guard preventing the spread of kudzu vertically over the guard.

2. The method of claim 1 wherein the guard is formed in the shape of a tube and is placed about an object in the clear zone.

3. The method of claim 2 wherein the tube is placed about a tree trunk having a diameter less than about eight inches.

4. The method of claim 3 wherein the tube is formed with serrations at at least one end of the tube, and said serrations are inwardly bent toward the object and said serrations at least partially assist in maintaining the guard in the clear zone.

5. The method of claim 2 wherein the tube is placed about a guy-wire.

6. The method of claim 5 wherein the tube is equipped with caps which secure the tube to the guy-wire.

7. The method of claim 2 wherein the tube is formed having a substantially circular cross section.

8. The method of claim 1 wherein the guard is formed as a flag having a sheet bent about an object to form a flap which connects to the sheet around the object with the flap and sheet forming a pocket therein.

9. The method of claim 8 wherein the flag extends at least about twelve inches in width from the object to a side of the sheet.

10. The method of claim 1 wherein the clear zone is provided by mechanically clearing vegetation from the clear zone.

11. The method of claim 1 further comprising the step of attaching the guard to a fence and extending the guard down to ground level and at least forty two inches above the ground level, said guard located opposite the fence from the area to be protected.

12. The method of claim 1 wherein the guard is formed of a plastic sheet.

13. The method of claim 1 wherein the vertical clear zone extends horizontally for at least five feet from the guard.

14. The method of claim 1 wherein the guard is placed about the trunk of the tree and the area to be protected is an upper portion of the tree.

15. A method of controlling the spread of kudzu comprising the steps of:
    providing a clear zone having a height of about five feet and having no member with a horizontally extending portion in the clear zone and no vertically extending member less than about eight inches in diameter except for objects to be guarded;
    placing a guard sheet on each of the objects to be guarded, each of said guard sheets having an effective length of at least about forty two inches, said guards preventing the upward climb of kudzu above the guards; and
    allowing kudzu to grow against the guard, and said guard preventing the spread of kudzu vertically over the guard.

16. The method of claim 15 wherein the clear zone is established on the edge of a timber stand and extends approximately thirty into a depth of the pine stand.

17. The method of claim 15 wherein the clear zone has a width of at least about three feet extending horizontally from the clear zone toward a direction of expected kudzu advance.

18. A method of controlling the spread of kudzu comprising the steps of:
    ensuring that a clear zone is established around vertically extending members having a diameter of less than about eight inches and having a circumference less than about twenty-four inches wherein the clear zone has a height of about at least about five feet;
    placing a guard sheet on each of the objects to be guarded, each of said guard sheets having a length of about forty-two inches and a substantially continuous exterior surface, said guards providing no footholds for kudzu to continue an upward climb; and
    allowing kudzu to grow against the guard, and said guard preventing the spread of kudzu vertically over the guard.

19. The method of claim 18 wherein the clear zone has a width of at least about three feet extending horizontally from the clear zone toward a direction of expected kudzu advance.

20. The method of claim 19 wherein the clear zone extends at least five feet horizontally.

\* \* \* \* \*